United States Patent
Kawahara

[11] Patent Number: 5,393,204
[45] Date of Patent: Feb. 28, 1995

[54] WOBBLE PLATE TYPE REFRIGERANT COMPRESSOR

[75] Inventor: Takayuki Kawahara, Saitama, Japan

[73] Assignee: Sanden Corporation, Isesaki, Japan

[21] Appl. No.: 11,150

[22] Filed: Jan. 29, 1993

[30] Foreign Application Priority Data

Jan. 29, 1992 [JP] Japan .................. 4-002773[U]

[51] Int. Cl.$^6$ .................................................. F04B 1/12
[52] U.S. Cl. .......................... 417/269; 91/499; 184/6.16
[58] Field of Search ............... 417/269; 91/472, 499; 184/5.1, 6.16, 6.17, 6.18; 384/474, 475

[56] References Cited

U.S. PATENT DOCUMENTS

| | | |
|---|---|---|
| 2,835,436 | 5/1958 | Steinhagen et al. |
| 3,085,514 | 4/1963 | Budzich . |
| 3,209,701 | 10/1965 | Phinney . |
| 3,408,123 | 10/1968 | Zwicky ........................ 384/475 |
| 3,552,886 | 1/1971 | Olson, Jr. . |
| 3,712,759 | 1/1973 | Olson, Jr. .................... 417/269 |
| 3,838,942 | 10/1974 | Pokorny ...................... 417/269 |
| 3,945,765 | 3/1976 | Toyoda et al. ............... 417/269 |
| 4,005,948 | 1/1977 | Hiraga et al. ................ 417/269 |
| 4,236,878 | 12/1980 | Terauchi ...................... 417/269 |
| 4,303,379 | 12/1981 | Hiraga et al. ................ 418/55 |
| 4,314,796 | 2/1982 | Terauchi ...................... 418/55 |
| 4,444,549 | 4/1984 | Takahashi et al. ............ 417/269 |
| 4,527,963 | 7/1985 | Terauchi ...................... 418/55 |
| 4,538,975 | 9/1985 | Tsukagoshi .................. 418/55 |
| 4,547,138 | 10/1985 | Mabe et al. .................. 418/55 |
| 4,701,109 | 10/1987 | Daikohara .................... 417/269 |
| 4,822,252 | 4/1989 | Ishikawa et al. ............. 417/269 |
| 4,964,741 | 10/1990 | Gaerte .......................... 384/475 |

Primary Examiner—Richard A. Bertsch
Assistant Examiner—M. Kocharov
Attorney, Agent, or Firm—Baker & Botts

[57] ABSTRACT

A wobble plate type compressor includes a cylinder housing having a cylinder block and a front end plate. The interior of the housing defines a crank chamber between the cylinder block and the front end plate. Pistons are respectively slidably fitted within each of a plurality of cylinders within the cylinder block and are reciprocated by a drive mechanism. The drive mechanism includes a drive shaft, a rotor fixed to the drive shaft and a wobble plate disposed on an inclined surface of the rotor. The drive shaft is supported in the center of the front end plate through a radial needle bearing. The radial needle bearing comprises a plurality of cylindrical rollers annularly arranged around the drive shaft and a cylindrical outer race covering the rollers. At least one hole is formed on the circumference of the outer race. An oil passageway is formed within the front end plate and extends between the interior of the crank chamber outside of the rotor and the hole in the race.

21 Claims, 5 Drawing Sheets

WOBBLE PLATE TYPE REFRIGERANT COMPRESSOR

BACKGROUND OF THE INVENTION

1. Field Of The Invention

This invention relates to a wobble plate type refrigerant compressor, and more particularly, to a mechanism for lubricating a radial needle bearing which rotatably supports a drive shaft in the center of a front end plate.

2. Description Of The Prior Art

Figure 1:
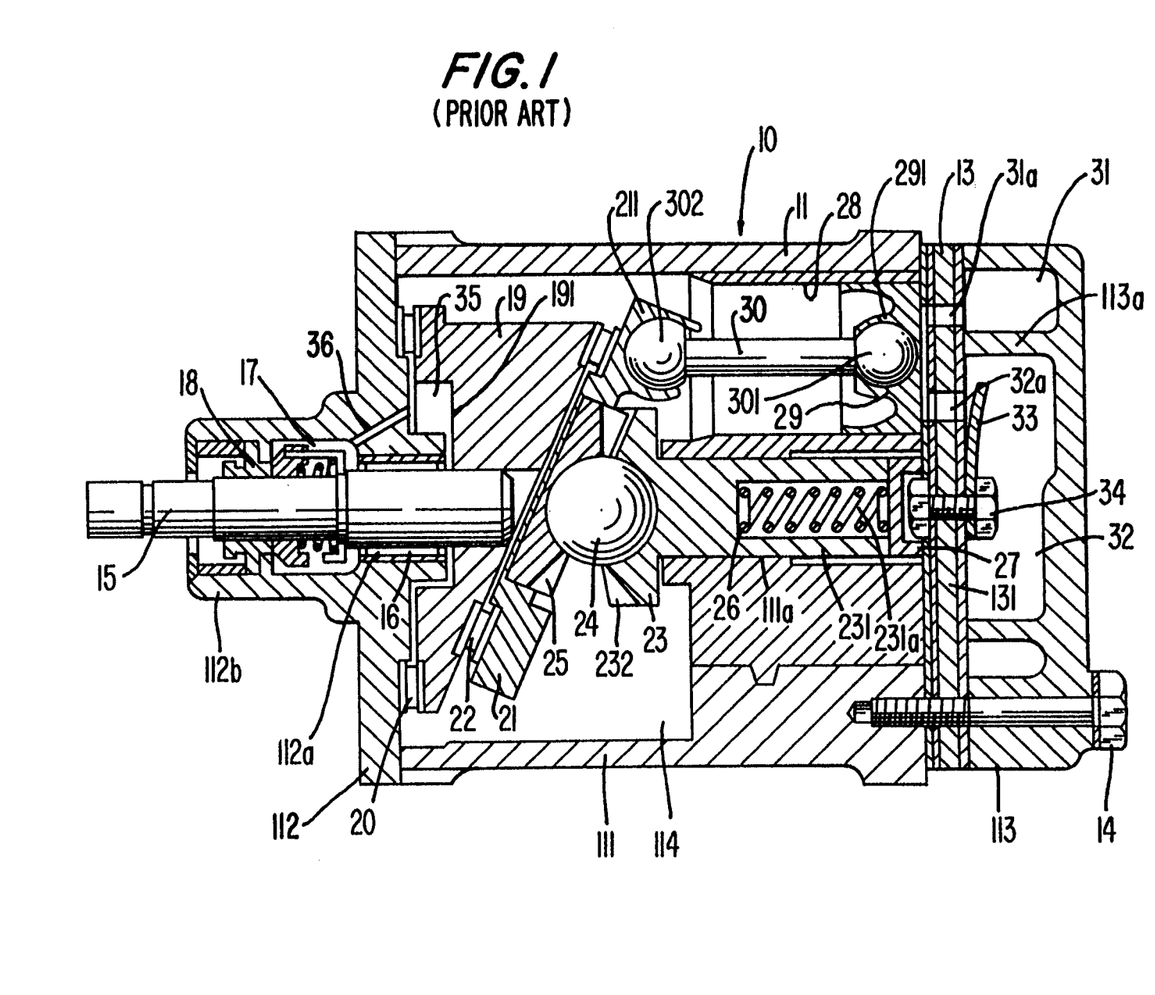
FIG. 1 is a sectional view of a wobble plate type refrigerant compressor in accordance with the prior art.

Referring to FIG. 1, a wobble plate type refrigerant compressor 10 is shown. Compressor 10 includes cylindrical housing 11 comprising cylinder block 111, front end plate 112 and cylinder head 113. A front end plate 112 is mounted on the left end portion of cylinder block 111 by a plurality of bolts (not shown). Cylinder head 113 together with valve plate assembly 13 are mounted on the right end portion of a cylinder block 111 by a plurality of bolts 14. A crank chamber 114 is formed between cylinder block 111 and end plate 112. Opening 112a is centrally formed in front end plate 112 and drive shaft 15 is rotatably supported by a radial needle bearing 16 disposed in opening 112a. Front end plate 112 includes annular sleeve portion 112b projecting from the front surface thereof. Annular sleeve 112b surrounds drive shaft 15 to define a shaft seal chamber 17 in which a shaft seal element 18 is disposed.

Drive shaft 15 is attached to a cam rotor at its inner end by any suitable means so that cam rotor 19 is rotated along with drive shaft 15. Cam rotor 19 is supported on an inner surface of the front end plate 112 by means of a thrust needle bearing 20 disposed at the inner surface of front end plate 112. Wobble plate 21 is disposed on inclined surface of cam rotor 19 through thrust needle bearing 22.

Supporting member 23 comprises shank portion 231 having an axial hole 231a formed therein and a bevel gear portion 232 at the end of shank portion 231. Shank portion 231 is inserted into axial hole 111a which is formed in cylinder block 111. Supporting member 23 is prevented from rotating by means of a key means and key groove (not shown). In addition, supporting member 23 is axially slidable within axial hole 111a. Bevel gear portion 232 includes a seat for steel ball 24 at the center thereof. Bevel gear portion 232 engages bevel gear 25 mounted on wobble plate 21. Steel ball 24 is also positioned in a seat formed at the central portion of bevel gear 25, thereby allowing wobble plate 21 to be nutatably, but not rotatably, supported on steel ball 24. Coil spring 26 is disposed in axial hole 231a of supporting member 231. The outer end of spring 26 is in contract with screw member 27, thereby urging supporting member 23 toward wobble plate 21.

Cylinder block 111 is provided with a plurality of axial cylinders 28 formed therein. Pistons 29 are slidably disposed in cylinders 28, only one piston-cylinder arrangement being shown in FIG. 1. Each piston 29 is connected to wobble plate 21 through a piston rod 30 made of steel. Ball 301 at one end of rod 30 is firmly received in socket 291 of piston 29 by caulking an edge of socket 291, and ball 302 at the other end of rod 30 is firmly received in socket 211 of wobble plate 21 by caulking an edge of socket 211. Balls 301 and 302 slide along an inner spherical surface of sockets 291 and 211, respectively.

Cylinder head 113 is provided with suction chamber 31 and discharge chamber 32. Suction chamber 31 and discharge chamber 32 are separated by partition wall 113a. Valve plate assembly 13 includes valve plate 131 having suction ports 31a connecting suction chamber 31 with cylinders 28 and discharge ports 32a connecting discharge chamber 32 with cylinders 28. Valve plate assembly 13 further includes a suction reed valve (not shown), provided at each of suction ports 31a, and discharge reed valve (not shown), provided at each of discharge ports 32a. Additionally, gaskets (not shown) are provided to seal the mating surfaces of cylinder block 111, valve plate 131 and cylinder head 113. Stopper plate 33 restricts the movement of a discharge reed valve (not shown). Bolt and nut device 34 secures the circular gasket, the suction reed valve, the discharge reed valve, and stopper plate 33 to valve plate 131.

In operation of the compressor, drive shaft 15 is driven by any suitable driving source, such as an automobile engine. Cam rotor 19 rotates with drive shaft 15, causing wobble plate 21 to nutate about steel ball 24 according to the rotation of the inclined surface of cam rotor 19. The nutation of wobble plate 21 causes the reciprocation of each respective piston 29. With each rotation of cam rotor 19, piston 29 cycles through a suction stage in which refrigerant is drawn from suction chamber 31 and a compression stage in which refrigerant is expelled to discharge chamber 32.

While the compressor operates, part of the refrigerant gas in each cylinder 28 passes into crank chamber 114 through a gap between an inner wall of cylinder 28 and piston 29. This refrigerant is known as blow-by gas. In order to return the blow-by gas to suction chamber 31, a passageway (not shown), which is a so-called balance hole, is formed in cylinder block 111 and through valve plate assembly 13 to communicate between crank chamber 114 and suction chamber 31. Lubricating oil is stored in crank chamber 114. During operation, the lubricating oil is agitated, causing some of it to enter a mist state. This mist lubricates the internal moving parts of the compressor. Part of the oil mist in crank chamber 114 flows to suction chamber 31 together with the returning refrigerant gas through the balance hole, and the mist is sucked into respective cylinders 28 to lubricate the gap between pistons 30 and the inner wall of cylinders 28.

Cam rotor 19 is provided with a concave portion 191 on the front surface thereof. Concave portion 191 forms a circular space 35 between front end plate 112 and cam rotor 19. Front end plate 112 has an oil passageway 36 which communicates between space 35 and shaft seal chamber 17. Accordingly, oil flowing along the inner surface of housing 11 flows into space 35 through the gap between thrust needle bearing 20 and front end plate 112, and then flows into shaft seal chamber 17 through oil passageway 36. The lubricating oil in shaft seal chamber 17 flows into the gap between radial needle bearing 16 and drive shaft 15 through the front end of needle bearing 16, and flows into space 35 out the rear end of needle bearing 16.

When lubricating oil lubricates needle bearing 16, the gap between front end plate 112 and cam rotor 19 restricts the amount of oil flowing into space 35. Consequently, the amount of oil flowing into shaft seal chamber 17 is relatively small. Moreover, as the oil flowing into shaft seal chamber 17 accumulates therein, less lubricating oil reaches needle bearing 16. More particularly, after the pressure of the lubricating oil within shaft seal chamber 17 substantially equals that in circular space 35, the lubricating oil flowing through oil passageway 36 significantly decreases. In addition, lubricating oil enters and exits circular space 35 through thrust needle bearing 20. Consequently, there is no circulatory path for the lubricating oil to follow once behind cam rotor 19. With this structure, drive shaft 15 and needle bearing 16 are often insufficiently lubricated, thus allowing drive shaft 15 to flake and potentially ultimately fail.

SUMMARY OF THE INVENTION

Accordingly, it is an object of the preferred embodiments to provide a wobble plate type refrigerant compressor having a lubricating mechanism which sufficiently supplies lubricating oil suspended in the crank chamber to the friction surface between a drive shaft and a radial needle bearing, thereby preventing abrasion, flaking and the potential ultimate failure of the drive shaft and/or radial needle bearing.

A wobble plate type refrigerant compressor in accordance with the first preferred embodiment comprises a cylinder housing including a cylinder block, a front end plate and a cylinder head. The interior of housing defines a crank chamber between the cylinder block and the front end plate. The cylinder block has a plurality of cylinders in which pistons are respectively reciprocated by a wobble plate. The wobble plate member is adjacently disposed on and driven by the inclined surface of a cam rotor. The cam rotor member is fixedly secured on a drive shaft. The drive shaft is rotatably supported in the center of the front end plate by a radial needle bearing. The radial needle bearing comprises a plurality of cylindrical rollers arranged annularly around the drive shaft and a cylindrical outer race covering the circumference of rollers. The outer race has at least one hold formed on the circumferential surface thereof. A radial passageway formed in the end plate extends radially outside of the cam rotor. The hole communicates with the interior of the crank chamber through the passageway formed in the front end plate. Lubricating oil within the crank chamber flows through the passageway and the hole, and finally into the radial needle bearing. Accordingly, the radial needle bearing is sufficiently lubricated since there are no substantial flow restrictions between the crank chamber and the radial needle bearing.

In accordance with the second preferred embodiment, an annular groove having a predetermined width is annularly formed between the outer race of the radial needle bearing and the inner surface of an opening centrally formed in the front end plate. The outer race has at least one hole formed on the circumferential surface thereof. A radial passageway formed m the end plate extends from a point radially outside of cam rotor to the at least one hole. Accordingly, the annular groove communicates with the interior of crank chamber through the passageway. Lubricating oil within the crank chamber flows through passageway whereupon it surrounds the circumferential surface of the outer race. Then, the lubricating oil flows into the interior of the radial needle bearing through the hole in the race. As a result, a sufficient amount of lubricating oil flows through the passageway without significant flow restriction to thereby lubricate the radial needle bearing.

In either of the preferred embodiments, the lubricating oil flows a circulatory flow path as it lubricates the radial needle bearing. In particular, the lubricating oil flows from the crank chamber, into the passageway, through the hole in the race, through the radial needle bearings, into the space between the cam rotor and front end plate, and back to the crank chamber through the thrust needle bearing disposed between the cam rotor and the front end plate. Consequently, the drive shaft is less likely to fail due to lack of lubrication.

DETAILED DESCRIPTION OF THE PREFERRED EMBODIMENTS

Figure 2:
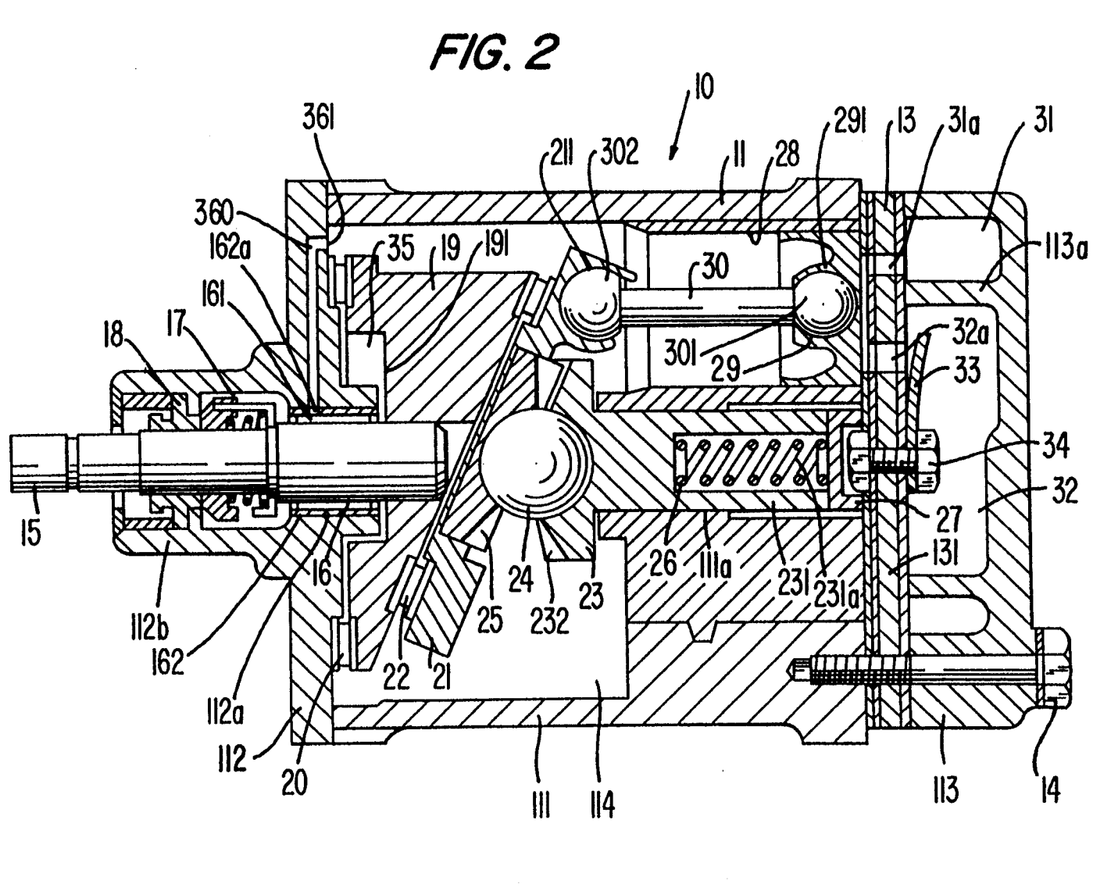
FIG. 2 is a sectional view of a wobble plate type refrigerant compressor in accordance with the first preferred embodiment.
Figure 3:
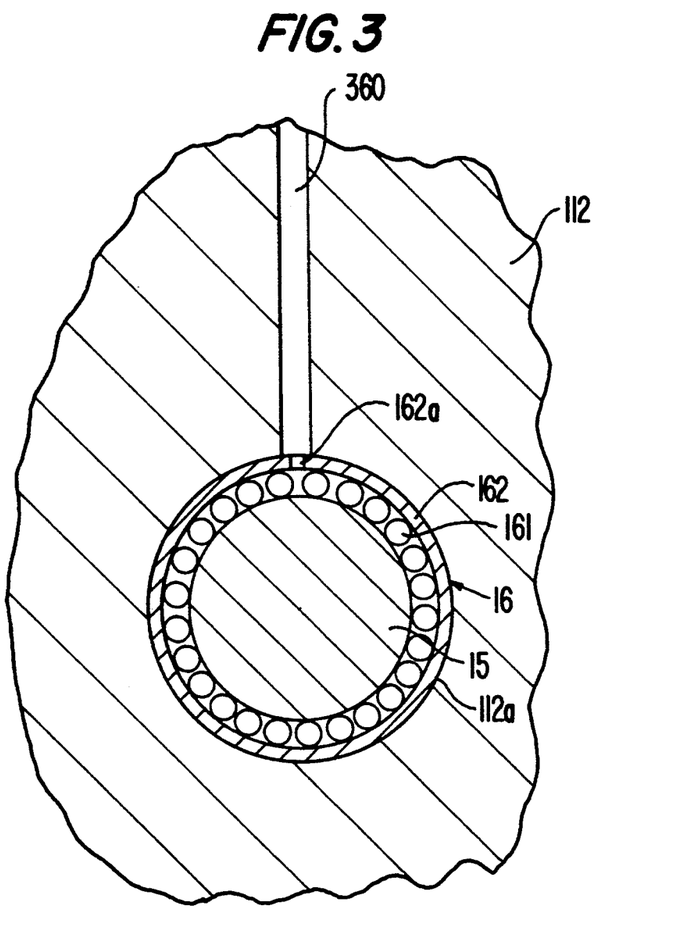
FIG. 3 is an enlarged partially cross-sectional view of a lubricating mechanism provided at the radial needle bearing of the wobble plate type refrigerant compressor shown in FIG. 2.

FIGS. 2–3 illustrate the first preferred embodiment. In these figures, the same numerals are used to denote corresponding elements shown in FIG. 1.

Referring to FIG. 2, a wobble plate type refrigerant compressor 10 has a cylindrical housing 11 comprising cylinder block 111, front end plate 112 and cylinder head 113. A front end plate 112 is mounted on the left end portion of cylinder block 111 by a plurality of bolts (not shown). Cylinder head 113 together with a valve plate assembly 13 are mounted on the right end portion of a cylinder block 111 by a plurality of bolts 14. A crank chamber 114 is formed between cylinder block 111 and front end plate 112. Opening 112a is centrally formed in front end plate 112 and drive shaft 15 is rotatably supported by a bearing, such as a radial needle bearing 16 disposed in opening 112a. Front end plate 112 includes annular sleeve portion 112b projecting from the front surface thereof. Annular sleeve 112b surrounds drive shaft 15 to define a shaft seal chamber 17 in which a shaft seal element 18 is disposed.

Drive shaft 15 is attached to a cam rotor 19 at its inner end by any suitable means so that cam rotor 19 is rotated along with drive shaft 15. Cam rotor 19 is supported on an inner surface of front end plate 112 by means by a bearing, such as thrust needle bearing 20 disposed at the inner surface of front end plate 112. Wobble plate 21 is disposed on the inclined surface of cam rotor 19 through thrust needle bearing 22.

Supporting member 23 comprises shank portion 231 having an axial hole 231a formed therein, and a bevel gear portion 232 at the end of shank portion 231. Shank portion 231 is inserted into axial hole 111a which is formed in cylinder block 111. Supporting member 23 is prevented from rotating by means of a key means and key groove (not shown). In addition, supporting member 23 is axially slidable within axial hole 111a. Bevel gear portion 232 includes a seat for steel ball 24 at the center thereof. Bevel gear portion 232 engages bevel gear 25 mounted on wobble plate 21. Steel ball 24 is also positioned in a seat formed at the central portion of bevel gear 25, thereby allowing wobble plate 21 to be nutatably, but not rotatably, supported on steel ball 24. Coil spring 26 is disposed in axial hold 231a of supporting member 231. The outer end of spring 26 is in contact with screw member 27, thereby urging supporting member 23 toward wobble plate 21.

Cylinder block 111 is provided with a plurality of axial cylinders 28 formed therein. Pistons 29 are slidably disposed in cylinders 28, only one piston-cylinder arrangement being shown in FIG. 1. Each piston 29 is connected to wobble plate 21 through a piston rod 30 made of steel. Ball 301 at one end of a piston 30 is firmly received in socket 291 of piston 29 by caulking an edge of socket 291, and ball 302 at the other end of piston rod 30 is firmly received in socket 211 of wobble plate 21 by caulking an edge of socket 211. Balls 301 and 302 slide along an inner spherical surface of sockets 291 and 211, respectively. It will be understood by those skilled in the art that, although only one ball-and-socket joint is shown in the drawing, there are a plurality of sockets arranged peripherally around wobble plate 21.

Cylinder head 113 is provided with suction chamber 31 and discharge chamber 32. Suction chamber 31 and discharge chamber 32 are separated by partition wall 113a. Valve plate assembly 13 includes valve plate 13 having suction ports 31a connecting suction chamber 31 with cylinders 28 and discharge ports 32a connecting discharge chamber 32 with cylinders 28. Valve plate assembly 13 further includes a suction reed valve (not shown), provided at each of suction ports 31a, and discharge reed valve (not shown), provided at each of discharge ports 32a. Additionally, gaskets (not shown) are provided to seal the mating surfaces of cylinder block 111, valve plate 131 and cylinder head 113. Stopper plate 33 restricts the movement of a discharge reed valve (not shown). Bolt and nut device 34 secures the circular gasket, the suction reed valve, the discharge reed valve, and stopper plate 33 to valve plate 131.

In operation of the compressor, drive shaft 15 is driven by any suitable driving source, such as an automobile engine. Cam rotor 19 rotates with drive shaft 15, causing wobble plate 21 to nutate about steel ball 24 according to the rotation of the inclined surface of cam rotor 19. The nutation of wobble plate 21 causes the reciprocation of each respective piston 29. With each rotation of cam rotor 19, piston 29 cycles through a suction stage in which refrigerant is drawn from suction chamber 31 and a compression stage in which refrigerant is expelled to discharge chamber 32.

While the compressor operates, part of the refrigerant gas in each cylinder 28 passes into crank chamber 114, through a gap between an inner wall of cylinder 28 and piston 29. This refrigerant is known as blow-by gas. In order to return the blow-by gas to suction chamber 31, a passageway (not shown), which is a so-called balance hole, is formed in cylinder block 111 and through valve plate assembly 13 to communicate between crank chamber 114 and suction chamber 31. Lubricating oil is stored in crank chamber 14. During operation of the compressor, the lubricating oil is agitated, causing some of it to enter a mist state. This mist lubricates the internal moving parts of the compressor. Part of the oil mist in crank chamber 114 flows to suction chamber 31 together with the returning refrigerant gas through the balance hole, and the mist is sucked into respective cylinders 28 to lubricate the gap between pistons 30 and the inner wall of cylinder 28.

With reference to FIG. 3, there is shown a partial cross sectional view through end plate 112 and drive shaft 15. A radial needle bearing 16 is disposed in opening 112a of end plate 112 to surround drive shaft 15. Radial needle bearing comprises a plurality of cylindrical rollers 161 arranged annularly around the circumferential surface of drive shaft 15 and a cylindrical outer race 162 covering rollers 161. Outer race 162 has a hole 162a on the top thereof. Hole 162a has a diameter designed to allow adequate lubricating oil to pass therethrough while at the same time maintaining the strength of race 162. In the preferred embodiment, hole 162a has an inner diameter in the range of 1.5 mm to 2.5 mm., preferably 2 mm. In addition, hole 162a is preferably formed at a central location of race 162 so that, when drive shaft 15 adds a high radial load to the front and rear ends of radial needle bearing 16, the strength of the front and rear ends of race 102 are not subjected to localized stresses associated with notches.

A communication passage 360 is formed radially within front end plate 112. As shown in FIG. 2, an opening 361 is formed on front end plate 112 radially outside of cam rotor 19. At one end, communication passage 360 opens into hole 162a, and at its other end, communication passage 360 opens into opening 361. Accordingly, communication passage 360 provides a path of fluid communication between crank chamber 114 and hole 162a, and thus, a fluid communication path is established between crank chamber 114 and the interior of radial needle bearing 16.

When drive shaft 15 turns, some of the lubricating oil flowing along the inner surface of housing 11 is drawn into opening 361. Once inside opening 361, the lubricating oil flows through passageway 360 and into the interior of radial needle bearing 16 through hole 162a. Accordingly, lubricating oil is supplied to radial needle bearing 16. Since opening 361 of passageway 360 is disposed on the inner surface of front end plate 112 outside of cam rotor 19, the interior of radial needle bearing 16 communicates directly with crank chamber 114. Accordingly, at all operating capacities, sufficient lubricating oil is delivered to radial needle bearing 16, thereby reducing the likelihood that drive shaft 15 will fail due to insufficient lubrication.

Figure 4:
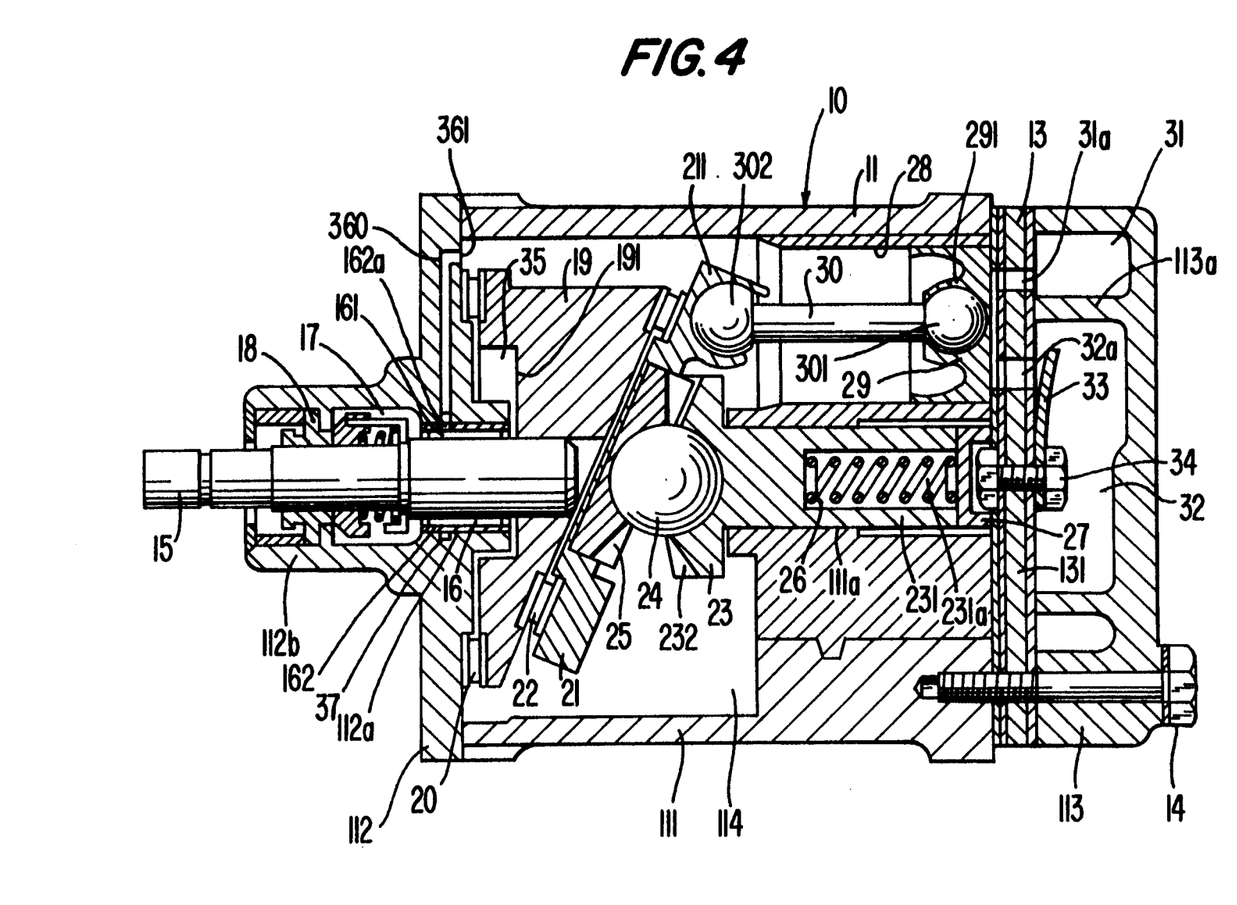
FIG. 4 is a sectional view of a wobble plate type refrigerant compressor in accordance with the second preferred embodiment.
Figure 5:
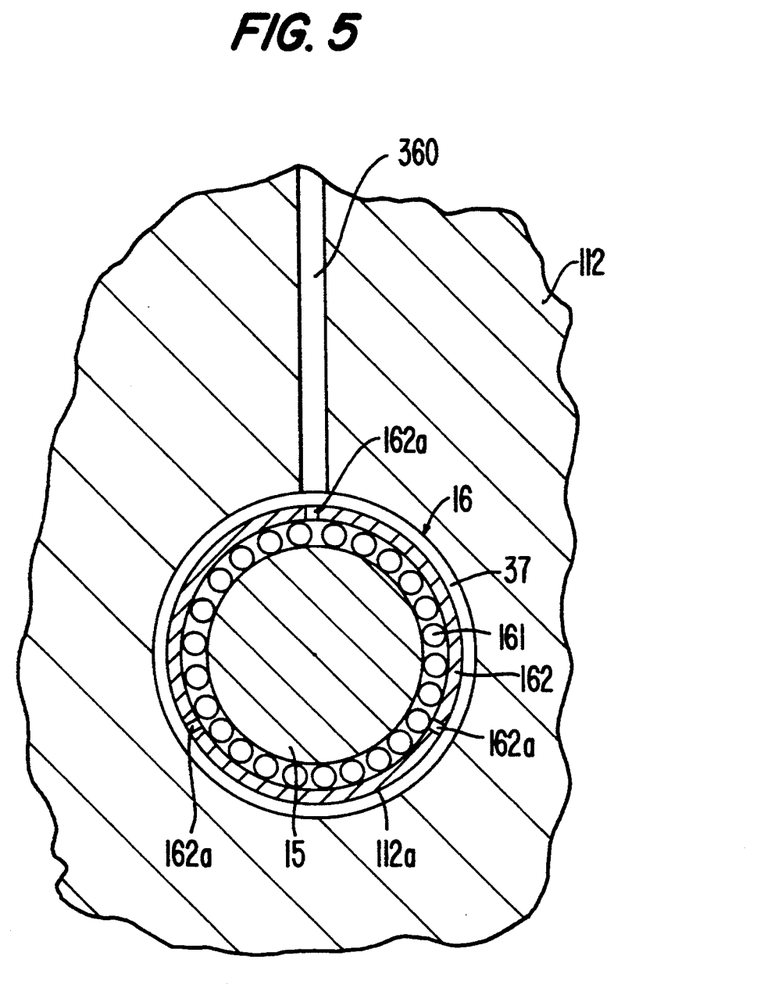
FIG. 5 is an enlarged partially cross-sectional view of a lubricating mechanism provided at the radial needle bearing of the wobble plate type refrigerant compressor shown in FIG. 4.

FIGS. 4-5 illustrate a second preferred embodiment. In FIGS. 4-5, the same reference numerals are used to denote corresponding elements shown in FIGS. 1-3. Therefore, the description is primarily reserved for those features that differ from those of the first preferred embodiment.

With reference to FIGS. 4-5, there is shown a partial cross-sectional view through end plate 112 and drive shaft 15. A radial needle bearing 16 is disposed in opening 112a of end plate 112 to surround drive shaft 15. Radial needle bearing comprises a plurality of cylindrical rollers 161 arranged annularly around the circumferential surface of drive shaft 15 and a cylindrical outer race 162 covering rollers 161. Outer race 162 has a hole 162a on the top thereof. In addition, outer race 162 has a plurality of additional holes equally spaced therearound. In the second preferred embodiment, three holes are shown around the periphery of race 162, however, additional or fewer holes could also be provided around race 162 without departing from the scope of the preferred embodiment.

Holes 162a have a diameter designed to allow adequate lubricating oil to pass therethrough while at the same time maintaining the strength of race 162. In the preferred embodiment, holes 162a have an inner diameter in the range of 1.5 mm to 2.5 mm, preferably 2 mm.

In addition, holes 162a are preferably formed at a central location of race 162 so that, when drive shaft 15 adds a high radial load to the front and rear ends of radial needle bearing 16, the strength of the front and rear ends of race 162 are not subjected to localized stresses typically associated with notches.

In the second preferred embodiment, an annular groove 37 is formed along the periphery of opening 112a in front end plate 112. In addition, a communication passage 360 is formed radially within front end plate 112. Annular groove 37 is positioned so that it partially extends into communication path 360. The interior of radial needle bearing 16 is lubricated by oil flowing sequentially through communication passage 360, groove 37 and holes 162a. More particularly, as shown in FIG. 4, an opening 361 is formed on front end plate 112 radially outside of cam rotor 19. At one end, communication passage 360 opens into opening 361, and at its other end, communication passage 360 opens into groove 37. Accordingly, communication passage 360 provides a path of fluid communication between crank chamber 114 and groove 37, and thus, a fluid communication path is established between crank chamber 114 and the interior of radial needle bearing 16 through the plurality of holes 37a.

The width of the groove 37, or in other words, the gap between the outer periphery of race 162 and the distal end of communication path 360 is preferably substantially equal to or greater than the diameter of holes 162a. Accordingly, the width of groove 37 is determined to be in the range of 1.5 mm to 2.5 mm, preferably substantially equal to or greater than 2.0 mm.

In the second preferred embodiment, when drive shaft 15 turns, some of the lubricating oil flowing along the inner surface of housing 11 is drawn into opening 361. Once inside opening 361, the lubricating oil flows through passageway 360, into groove 37 and into the interior of radial needle bearing 16 through holes 162a. Accordingly, lubricating oil is supplied to radial needle bearing 16. Since opening 361 of passageway 360 is disposed on the inner surface of front end plate 116 radially outside of cam rotor 19, the interior of radial needle bearing 16 communicates directly with crank chamber 114. Accordingly, at all operating capacities, sufficient lubricating oil is delivered to radial needle bearing 16, thereby reducing the likelihood that the drive shaft 15 will fail due to insufficient lubrication.

The invention has been described in detail in connection with the preferred embodiment. This embodiment, however, is merely for example only and the invention is not restricted thereto. It will be understood by those skill in the art that other variations and modifications can be easily made within the scope of this invention as defined by the claims.

I claim:

1. A wobble plate type compressor comprising:
   a compressor housing including a cylinder block, a front end plate and a cylinder head, said cylinder block having a plurality of cylinders in which a plurality of pistons are slidably disposed, said front end plate having an opening formed therein, said compressor housing forming a suction chamber, a discharge chamber and a crank chamber;
   a drive mechanism including a drive shaft and a rotor mounted on said drive shaft for rotation therewith, said drive shaft extending at least partially into said compressor housing through the opening in said front end plate and said rotor rotatably disposed in said crank chamber against said front end plate;
   a wobble plate operationally driven by said rotor;
   coupling means for operationally coupling said wobble plate to said pistons such that the rotation of said rotor causes said wobble plate to reciprocate said pistons in said cylinders;
   bearing means for rotatably supporting said drive shaft in the opening in said front end plate; and
   a communication path having at least two ends wherein a first end of said communication path opens directly into said bearing means and a second end of said communication path opens into said crank chamber radially outside said rotor, said first end of said communication path directing substantially all of the lubricating oil exiting therefrom directly to said bearing means.

2. The wobble plate type compressor of claim 1, said bearing means comprising:
   a plurality of roller elements arranged annularly around said drive shaft; and
   a race disposed on the outer circumference of said roller elements, said race having at least one hole formed therein.

3. The wobble plate type compressor of claim 2, wherein the at least one hole has a diameter of 2 mm.

4. The wobble plate type compressor of claim 1, said communication path extending radially within said front end plate.

5. A wobble plate type compressor comprising:
   a compressor housing including a cylinder block, a front end plate and a cylinder head, said cylinder block having a plurality of cylinders in which a plurality of pistons are slidably disposed, said front end plate having an opening formed therein, said compressor housing forming a suction chamber, a discharge chamber and a crank chamber;
   a drive mechanism including a drive shaft and a rotor mounted on said drive shaft for rotation therewith, said drive shaft extending at least partially into said compressor housing through the opening in said front end plate and said rotor rotatably disposed in said crank chamber against said front end plate;
   a wobble plate operationally driven by said rotor;
   coupling means for operationally coupling said wobble plate to said pistons such that the rotation of said rotor causes said wobble plate to reciprocate said pistons in said cylinders;
   bearing means for rotatably supporting said drive shaft in the opening in said front end plate;
   a communication path having at least two ends wherein a first end of said communication path opens into said bearing means and a second end of said communication path opens into said crank chamber radially outside said rotor;
   a plurality of roller elements arranged annularly around said drive shaft;
   a race disposed on the outer circumference of said roller elements, said race having at least one hole formed therein; and
   an annular groove formed between said race and said communication path.

6. The wobble plate type compressor of claim 5, wherein said race has a plurality of holes formed therearound.

7. The wobble plate type compressor of claim 6, wherein said plurality of holes are spaced equiangularly around said race.

8. The wobble plate type compressor of claim 5, said annular groove having a width substantially equal to or greater than the width of the at least one hole formed in said race.

9. The wobble plate type compressor of claim 5, said annular groove having a substantially rectangular cross-sectional shape.

10. A wobble plate type compressor comprising:
- a compressor housing including a cylinder block, a front end plate and a cylinder head, said cylinder block having a plurality of cylinders in which a plurality of pistons are slidably disposed, said front end plate having an opening formed therein, said compressor housing forming a suction chamber, a discharge chamber and a crank chamber;
- a drive mechanism including a drive shaft and a rotor mounted on said drive shaft for rotation therewith, said drive shaft extending at least partially into said compressor housing through the opening in said front end plate and said rotor rotatably disposed in said crank chamber against said front end plate;
- a wobble plate operationally driven by said rotor;
- coupling means for operationally coupling said wobble plate to said pistons such that the rotation of said rotor causes said wobble plate to reciprocate said pistons in said cylinders;
- bearing means for rotatably supporting said drive shaft in the opening in said front end plate;
- a groove formed in the opening of said front end plate and at least partially surrounding said bearing means; and
- a communication path having at least two ends wherein a first end of said communication path opens directly into the groove in said front end plate and a second end of said communication path opens into said crank chamber radially outside said rotor, said first end of said communication path directing substantially all of the lubricating oil exiting therefrom directly to said groove.

11. The wobble plate type compressor of claim 10, said bearing means comprising:
- a plurality of roller elements arranged annularly around said drive shaft; and
- a race disposed on the outer circumference of said roller elements, said race having at least one hole formed therein.

12. The wobble plate type compressor of claim 11, said race disposed in the opening of said front end plate such that the at least one hole in said race is aligned with said groove.

13. The wobble plate type compressor of claim 11, wherein the at least one hole has a diameter of 2 mm.

14. The wobble plate type compressor of claim 10, said communication path extending radially within said front end plate.

15. A wobble plate type compressor comprising:
- a compressor housing including a cylinder block, a front end plate and a cylinder head, said cylinder block having a plurality of cylinders in which a plurality of pistons are slidably disposed, said front end plate having an opening formed therein, said compressor housing forming a suction chamber, a discharge chamber and a crank chamber;
- a drive mechanism including a drive shaft and a rotor mounted on said drive shaft for rotation therewith, said drive shaft extending at least partially into said compressor housing through the opening in said front end plate and said rotor rotatably disposed in said crank chamber against said front end plate;
- a wobble plate operationally driven by said rotor;
- coupling means for operationally coupling said wobble plate to said pistons such that the rotation of said rotor causes said wobble plate to reciprocate said pistons in said cylinders;
- bearing means for rotatably supporting said drive shaft in the opening in said front end plate;
- a groove formed in the opening of said front end plate and at least partially surrounding said bearing means;
- a communication path having at least two ends wherein a first end of said communication path opens into the groove in said front end plate and a second end of said communication path opens into said crank chamber radially outside said rotor;
- a plurality of roller elements arranged annularly around said drive shaft;
- a race disposed on the outer circumference of said roller elements, said race having at least one hole formed therein; and
- wherein said groove is an annular groove completely encircling at least a portion of said race.

16. The wobble plate type compressor of claim 15, wherein said race has a plurality of holes formed therearound.

17. The wobble plate type compressor of claim 16, wherein said plurality of holes are spaced equiangularly around said race.

18. The wobble plate type compressor of claim 15, said annular groove having a width substantially equal to or greater than the width of the at least one hole formed in said race.

19. The wobble plate type compressor of claim 15, said annular groove having a substantially rectangular cross-sectional shape.

20. A wobble plate type compressor comprising:
- a compressor housing including a cylinder block, a front end plate and a cylinder head, said cylinder block having a plurality of cylinders in which a plurality of pistons are slidably disposed, said front end plate having an opening formed therein, said compressor housing forming a suction chamber, a discharge chamber and a crank chamber;
- a drive mechanism including a drive shaft and a rotor mounted on said drive shaft for rotation therewith, said drive shaft extending at least partially into said compressor housing through the opening in said front end plate and said rotor rotatably disposed in said crank chamber against said front end plate;
- a wobble plate operationally driven by said rotor;
- coupling means for operationally coupling said wobble plate to said pistons such that the rotation of said rotor causes said wobble plate to reciprocate said pistons in said cylinders;
- bearing means for rotatably supporting said drive shaft in the opening in said front end plate; and
- a communication path extending through said front end plate and having at least two ends wherein a first end of said communication path opens directly into said bearing means and a second end of said communication path opens into said crank chamber radially outside an outermost radial surface of said rotor, thereby bypassing said rotor, said first end of said communication path directing substantially all of the lubricating oil exiting therefrom directly to said bearing means.

21. A wobble plate type compressor comprising:

a compressor housing including a cylinder block, a front end plate and a cylinder head, said cylinder block having a plurality of cylinders in which a plurality of pistons are slidably disposed, said front end plate having an opening formed therein, said compressor housing forming a suction chamber, a discharge chamber and a crank chamber;

a drive mechanism including a drive shaft and a rotor mounted on said drive shaft for rotation therewith, said drive shaft extending at least partially into said compressor housing through the opening in said front end plate and said rotor rotatably disposed in said crank chamber against said front end plate;

a wobble plate operationally driven by said rotor;

coupling means for operationally coupling said wobble plate to said pistons such that the rotation of said rotor causes said wobble plate to reciprocate said pistons in said cylinders;

bearing means for rotatably supporting said drive shaft in the opening in said front end plate;

a groove formed in the opening of said front end plate and at least partially surrounding said bearing means; and a communication path extending through said front end plate and having at least two ends wherein a first end of said communication path opens directly into said groove and a second end of said communication path opens into said crank chamber radially outside an outermost radial surface of said rotor, thereby bypassing said rotor, said first end of said communication path directing substantially all of the lubricating oil exiting therefrom directly to said bearing means.

* * * * *